June 30, 1942. F. J. KENT 2,288,462
SOUND REPRODUCING SYSTEM
Filed June 25, 1940
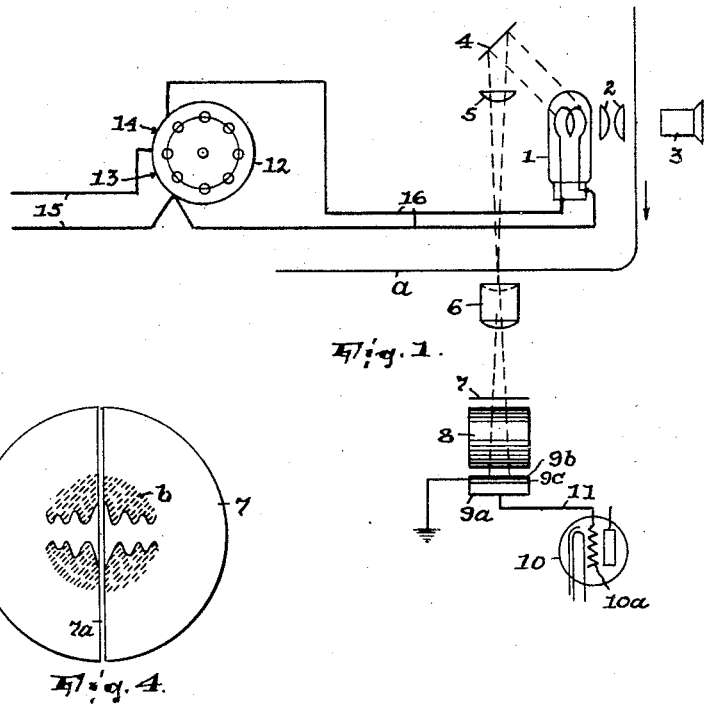
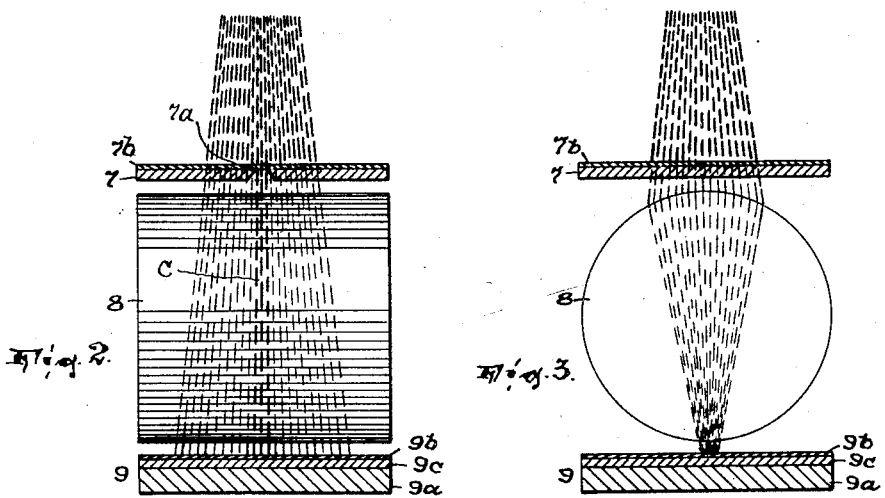
INVENTOR,
Frederick J. Kent,
BY John W. Steward.
ATTORNEY.

Patented June 30, 1942

2,288,462

UNITED STATES PATENT OFFICE 2,288,462

SOUND REPRODUCING SYSTEM

Frederick J. Kent, Glen Rock, N. J.

Application June 25, 1940, Serial No. 342,223

7 Claims. (Cl. 179—100.3)

The system commonly used for reproducing sound from the sound-track of a moving picture film involves in some way concentrating the light from a light-source on the sound-track in the form of a sharply defined line of light extending across the sound-track, the imposition of such a mere line of light on the sound-track being regarded as necessary in order to obtain as perfect scanning and hence modulation as possible considering the quite small dimensions of the sound-track components. Thus to concentrate the light in the form of a sharply defined line necessitates resort to optical means which has to be devised and its parts assembled with the most careful regard to accuracy and this, as is known, goes to make the system quite expensive.

According to the present invention, given a light-source and a conventional film having a sound-track-including portion, I provide for concentrating light from the light-source onto said portion, not as a more or less sharply defined line, but throughout an area too extensive lengthwise of the sound-track for true modulation thereat and of course at least substantially of as great width as the sound-track, and beyond said portion relatively to the light-source I effect the scanning and hence modulation by providing in the path of light penetrating the sound-track a screen on which an image of the said area of the sound-track will be imposed, such screen having a slit arranged transversely of the sound-track and across the image, whereby light allowed by the slit to pass the screen serves as the signal-control or the medium for energizing a photo-electric cell of the means for converting light into mechanical energy. Therefore if, as I further propose, the image is imposed on the screen through resort to some magnifying medium, as a suitable objective, a system results which is considerably less expensive than the conventional one and yet is adapted to produce good modulation. But I prefer to concentrate it to the form of a spot, and for this purpose I interpose between the screen and the cell a suitable lens, as one of cylindrical form having its axis transverse of the slit, whereby the light, which would otherwise be of varying area but constant intensity is converted into light having a substantially constant area but varying intensity. The screen may be opaque. But I prefer it to be translucent so that light penetrating its translucent area will serve to expand the sound-volume according to the average density of the sound-track.

In accordance with my invention, further, given a two-phase motor to drive the projector mechanism, the winding of one phase is a high impedance connected directly across the line and that of the other phase a low impedance connected in series with the projector lamp, used also as the said light-source for scanning the sound-track. Thereby the necessity for a separate phase splitting and switching device is avoided and a counter E. M. F. produced in the series windings improves the brightness of the lamp between cycle peak periods and noticeable A. C. hum pick-up by the photo-cell is avoided.

In the drawing:

Fig. 1 is a diagrammatic view of the essentials of the improved system, as a whole;

Fig. 2 is a similar view on a larger scale of the mentioned lens, screen and photo-cell as seen in Fig. 1, the screen and cell appearing in section;

Fig. 3 shows what appears in Fig. 2 but as viewed from the right in that figure; and Fig. 4 is a plan of the screen showing thereon the magnified image of the indicated area of the sound-track.

The projector lamp or light-source is indicated at 1; its light may be directed by the condenser lenses 2 to the picture frame of the suitably advanced film $a$. 3 is a projector lens.

4 is a mirror for directing light from the light-source onto the sound-track-including portion of the film, as through the medium of a condenser lens 5. The light is imposed on said portion of the sound-track as an area or spot of at least substantially as great width as the sound-track. 6 is an objective by which to project onto a screen 7 so much of the light rays as are allowed by the film to penetrate it, the image thus appearing on the screen being indicated at $b$ in Fig. 4. The magnification will usually be limited to about four times; in Fig. 4 it appears much greater but only for the purpose of illustration. Said screen is formed as follows:

It is here circular and provided with a modulating slit $7a$ of approximately .0015" width and preferably at least as long as the diameter of the image $b$ where it is imposed on the screen, being arranged at 90° to the sound-track. The screen may be opaque or translucent; but in order to accomplish one purpose of the invention, i. e., to expand the sound volume according to the average density of the sound-track, it is preferably translucent to permit some of the average light to penetrate it while that passing through the slit determines the signal control. If it is translucent I prefer that it shall be so as to its surface portion $7b$ which faces the objective, it may be red as to such surface portion whereby to filter out most of the blue or short light rays and effect reduction in hum pick-up and thus improve the tone quality. Some other light-filter color may be used, or the screen may have color combinations, as being as to one half of its area one color and as to the other half another color. The slit is preferably generally wedge-shaped in cross-section, with its wedge-apex directed toward the objective. I term the slit $7a$ a "modulating" slit since it acts modulatively with respect to the constantly changing image b on the screen.

It is known that the voltage response of the barrier-layer type of photo-electric cell is in proportion to the light intensity—that is, a small or a large area of light, both of equal intensity, will produce substantially the same voltage. In taking this into account in reproducing sound from a variable area sound-track I place beyond the screen relatively to the condenser lens 6 a lens 8 here cylindrical in form but which may have any form so long as it refracts the light-rays of the band c of light issuing from the slit substantially to a point. The axis of this lens is substantially 90° to the slit. Therefore the light-rays of band c, which would otherwise reach the cell in the form of a stripe, as would be the case if the lens were not present, are so concentrated by the lens that a light-spot, substantially rectangular, appears on the cell rather than a linear or elongated light-figure. A molded plastic lens (as of lucite), optically imperfect, may be used, and though this may involve some diffusion and development of a halo around the spot of substantially constant area, since it varies in intensity it aids in maintaining constant any relative internal short-circuiting losses.

9 is the photo-electric cell which may be of the emission, or photo-resistance, type; but I prefer the E. M. F. producing, as the barrier-layer, type comprising a metal plate 9a forming one electrode, a light-pervious metal sheet 9b forming the counter electrode, and a semiconductor 9c, as of selenium, sandwiched between the electrodes and exposed to the light from lens 6. This type of cell is preferred because it is efficient, less expensive than the resistance or emission type, requires no separate voltage source for its operation and favorably responds to lower-level illumination.

In order to obtain the best possible voltage response from a cell of this type whether the sound-track is of the variable area or variable intensity class the cell is preferably arranged in circuit as follows: 10 being the usual detector tube for the amplifier (not shown), 11 is a conductor leading from electrode 9c to ground and including the electrode 9a of the cell and the grid 10a of the tube. Thus the cell is directly in the grid circuit, practically an open circuit, wherefore the cell has linear response to light intensities from quite low to quite high and the quality of the sound reproduced is not appreciably influenced by the intensity of illumination in the scanning part of the system but is influenced substantially wholly by fluctuation of relative light intensity caused by the record or sound-track.

Referring, now, to the second-named feature of my invention: Let 12 be a two-phase A. C. motor for driving the projector mechanism, 13 and 14, respectively, being the high and low impedance windings of the two phases of the motor; the high impedance winding is connected directly across the A. C. line 15 affording a source of single-phase current for the motor and the low impedance winding is in series with the lamp 1 in a circuit completed by a conductor 16. Due to the difference in inductances in the two windings a phase shift is effected to drive the motor as a straight two-phase motor without a phase-splitting and switching device and the counter E. M. F. produced in the series windings, however slight, tends to sustain the brightness of the lamp filament between cycle peak periods whereby, whereas the filament has appreciable thermal inertia but not sufficient to eliminate noticeable A. C. hum pick-up at the photo-cell, such hum pick-up is eliminated by the inductance in the circuit.

Having thus fully described my invention, what I claim is:

1. A sound reproducing system including a light source, a movable sound record, means to concentrate light from said source onto a limited area of the record, a translucent screen arranged beyond the record relatively to said means and having a slit, magnifying means to project onto the area of the screen divided by the slit light escaping through the record and thereby position on the screen an image of said area, and a photo-sensitive medium in the path of light escaping through the screen and its slit.

2. The system set forth in claim 1 characterized by said medium being a barrier-layer photo-electric cell.

3. A sound reproducing system including a light source, a movable sound record, means to concentrate light from said source onto a limited area of the record, a screen arranged beyond the record relatively to said means and having a slit, magnifying means to project onto the area of the screen divided by the slit light escaping through the record and thereby position on the screen an image of said area, a barrier-layer photo-electric cell in the path of the light escaping through the slit, and means, between the screen and cell, to convert the light escaping through the slit from uniform intensity but variable amplitude to light having its intensity variable substantially in proportion to its amplitude.

4. The system set forth in claim 3 characterized by the screen being translucent.

5. A sound reproducing system including a light source, a movable sound record, means to concentrate light from said source onto a limited area of the record, a screen arranged beyond the record relatively to said means and having a slit, magnifying means to project onto the portion of the screen divided by the slit light escaping through the record and thereby position on said portion an image of said area, a barrier-layer photo-electric cell in the path of the light escaping through the slit, and means, between the screen and cell, to converge to substantially a spot light rays which pass through the slit in offset relation to each other lengthwise of the slit.

6. In combination, with an electric projector lamp, a source of single-phase current, and a two-phase induction motor having high-impedance and low-impedance windings, the high-impedance winding being connected directly with said source and the low-impedance winding and projector lamp being connected in series with said lamp whereby to effect a relative phase shift in the motor windings.

7. The combination of a photo-electric cell, means for energizing the cell comprising a two-phase induction motor and an electric light source in series with one of the windings of the motor, a movable sound record between said source and the cell, and optical means for controlling the light transmitted from said source to the cell whereby to reproduce the sound recorded on the record when the latter is in motion.

FREDERICK J. KENT.